Oct. 9, 1951 MARIE-THÉRÈSE MARTIN 2,570,701
HARMONIC-SELECTING APPARATUS
Filed Feb. 13, 1946 5 Sheets-Sheet 3

Inventor
M. T. Martin

Oct. 9, 1951 MARIE-THÉRÈSE MARTIN 2,570,701
HARMONIC-SELECTING APPARATUS

Filed Feb. 13, 1946 5 Sheets-Sheet 4

Inventor
M. T. Martin
By Glascock Downing Rutell
attys

Inventor
M. T. Martin

Patented Oct. 9, 1951

2,570,701

UNITED STATES PATENT OFFICE 2,570,701

HARMONIC-SELECTING APPARATUS

Marie-Thérèse Martin, Versailles, France

Application February 13, 1946, Serial No. 647,291
In France March 31, 1942

Section 1, Public Law 690, August 8, 1946
Patent expires March 31, 1962

4 Claims. (Cl. 179—171)

The present invention relates to a harmonic-selecting arrangement making it possible to select and adjust at will the harmonics of a simple or complex low-frequency alternating current, emanating, for example, from one or more low-frequency oscillators.

This selection of harmonics and adjustment of their relative amplitudes renders it possible to receive, at the output end of the apparatus, low-frequency currents which produce in a loud-speaker, after amplification, sounds, the quality or "timbre" of which is exactly determined.

This harmonic-selecting arrangement can function just as easily in the case when it is supplied with a single alternating current of definite frequency as when it is supplied with a variety of currents of diverse frequencies, of approximately the same or widely different values, without the fact of the co-existence of these frequencies producing interference of troublesome intensity.

The apparatus makes it possible to obtain, from a simple alternating current or from a number of alternating currents of diverse frequencies, currents which, after passing through an amplifier, are capable of producing in a loud-speaker sounds similar to those produced by one or more musical instruments, determined in advance, playing together or separately, according to any combination required.

Thus the said arrangement makes it possible, among other applications, to constitute an electric organ, comprising on the one hand a certain number of oscillators of any kind controlled by one or more keyboards, together with the said arrangement, and finally one or more amplifiers followed by loud-speakers. The harmonic-selecting arrangement is then connected to contact-making switches each bearing an indication relating to some definite organ stop. By acting on these switches as upon the stops of a pipe organ of standard construction, the performer is able to choose whichever stop or stops he wishes.

The apparatus makes it possible in addition to produce new musical instruments, controlled by keyboards or by any other means. The tone qualities of these instruments may be new or may correspond to those of known instruments.

The harmonic-selecting device according to the invention, interposed between an oscillator and a sound-output means, such as a loud-speaker, is characterised by the use of a chain of transformers, identical or different, coupled in series, and capable of being short-circuited individually, the secondary windings of which are inserted into the grid circuit of a triode valve connected to the amplifier arranged before the loud-speaker.

In particular, when a number of oscillators are utilised, the latter are either each connected to the amplifier by a selector arrangement similar to that described, or, if they are mounted in parallel or in series, are connected to the amplifier by a single selector arrangement.

When several selector groups are used, each group constituting a selecting arrangement constructed according to the invention and comprising one or more transformers, may be provided for a definite number of musical notes. The assemblage of groups thus makes it possible to cover one or more octaves.

The harmonic-selecting arrangement according to the invention is also characterised by the feature that each of the transformers constituting the chain comprises a primary coupling winding connected to the circuit of the oscillator, a secondary winding inserted between the earth or mass and the grid of the valve previously mentioned, and finally an auxiliary winding the function of which is to eliminate undesirable frequencies, interferences etc. The windings of the various successive transformers for coupling with the oscillator and the windings for connection to the valve grids are respectively mounted in series.

The invention also concerns the constitution of the transformers of harmonic-selectors, and is characterised by constructional features such as the following, given by way of example: the magnetic circuit of all or of certain of the transformers is either open, partially open or totally closed, according to the result desired. This magnetic circuit is constituted according to circumstances by laminated iron strips or else by solid iron, or by any other magnetic material; the magnetic coupling of the windings is more or less tight according to their function; and the characteristics of the winding of the coils are selected according to the purpose in view in the particular usage of each of the transformers.

In agreement with the principle of construction according to the invention, the winding of each of the transformers connected to the valve grid is provided with a shunt circuit comprising: on one hand, a switch making it possible to short-circuit the winding, it being possible to actuate this switch separately or at the same time as each of the switches similarly mounted in the shunt circuits of the other transformers, and, on the other hand, condensers, resistances, inductances or combinations of these elements, making it possible to determine the characteristics of the shunt circuit, and thus to effect control of the same, and to carry out any desired regulation of the relative proportions of the harmonics.

The invention also concerns improvements in the circuit connections of the control elements mentioned above, these improvements being characterised by the possibility of putting one or more or all of the control elements into or out of action, or again of putting the transformer itself out of service by short-circuiting its winding, this being carried out at will and as required by the simple control of switches suitably arranged, thus making it possible at any instant to obtain the musical tone and volume required.

According to the invention, improvements identical in principle with those just described are applicable to the shunt circuit of the auxiliary transformer winding provided for the elimination of undesirable frequencies and interference.

Finally the invention extends to methods of realisation and utilisation of harmonic-selecting arrangements characterised by the feature that the oscillators producing the alternating supply current may be of any kind, for instance, microphones, vibration-scanning devices, or else acoustic resonators connected with a musical instrument, acting on the vibration-scanning devices connected to the harmonic-selecting arrangement, permitting in the latter case the modification or amplification as may be desired of the natural sound of one or more musical instruments.

Other characteristics will appear from the detailed description which follows.

The accompanying drawings, given solely by way of example, show diagrammatically forms of construction and circuit connections of harmonic-selecting devices or groups of devices in agreement with the invention.

Figure 1:
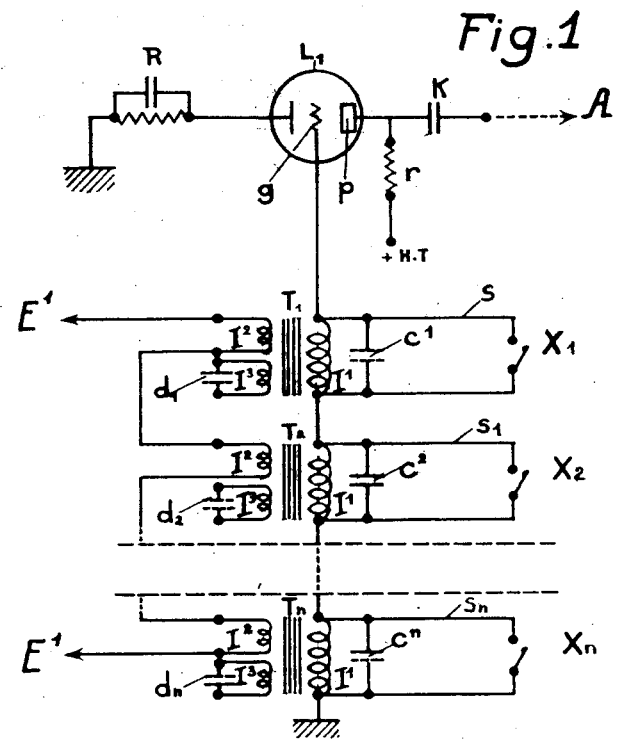
Figure 1 is a diagram of a harmonic-selecting arrangement according to the invention.

In the diagram of harmonic-selector shown in Figure 1 it will be seen that in agreement with the invention, a chain of transformers $T_1$, $T_2$ ... $T_n$, is interposed between an oscillator $E^1$ and an amplifier A mounted in front of a loud-speaker, such as a loud-speaker, not shown, the secondary windings $I^1$ of these transformers being coupled in series.

The oscillator $E^1$ may be of any conventional type suitable for the purpose of generating complex electric oscillations of musical frequencies, and may be for example be of the construction described in the amplifier is likewise conventional in character as used for instance in radio construction. Neither of the elements $E^1$ and A form any part of this invention.

Each of these transformers comprises on an iron core, which may be either open or partially or completely closed as more fully described hereinafter in connection with Figs. 2, 4, and 6, in addition to the secondary winding $I^1$, a winding $I^2$ connected in the circuit of the oscillator $E^1$, and an independent winding $I^3$ the function of which is to attenuate or eliminate interferences which may be produced when several currents of similar frequencies are applied to the apparatus.

All the primary windings $I^2$ are connected in series in the circuit of the oscillator $E^1$.

All the secondary windings $I^1$ are likewise connected in series, one of their extremities being connected to earth and the other extremity to the grid $g$ of a three-electrode valve, the plate current of which is led to the amplifier A, through a connecting condenser K. A high-tension current is applied, passing through a resistance $r$ on the connection between the valve plate $p$ and the condenser K.

Each winding $I^1$ of the various transformers comprises a shunt circuit $s$, $s^1$ ... $s^n$, in which is mounted a switch $x_1$, $x_2$ ... $x_n$ when this switch is closed the corresponding transformer is shunted and thus put out of action.

Condensers, resistances, inductances or combinations of these elements denoted by $c^1$, $d^1$, $c^2$, $d^2$ ... $c^n$, $d^n$ are connected respectively in the circuits of the windings $I^1$ and $I^3$ of each transformer to modify their characteristics and to carry out any desired proportioning of the harmonics. In addition, the cathode Ca of the valve $L^1$ is earthed through the medium of a system comprising a resistance and a polarisation condenser R.

The transformers $T_1$, $T_2$ ... $T_n$ may be alike or different according to requirements. In general they are selected with different characteristics, and a definite part is assigned to each.

The various circuits of these transformers are so adjusted as to obtain the required relative strengths of the harmonics. The windings $I^1$ and $I^3$ are tuned by means of condensers, resistances, inductances or other elements denoted by $c^1$, $d^1$, etc., and render it possible to modify the characteristics of these windings as to obtain an exact regulation of the selected harmonics. By proceeding in this way to the extreme limit it is possible so to tune the circuits as to suppress all harmonics, leaving only the fundamentals.

The system of coupling windings $I^2$ connected in series preferably possesses a very low impedance.

As has been explained above, by positively controlling the switches $x_1, x_2 \ldots x_n$ it is possible to short-circuit and consequently put out of action one or more of the transformers, thus making it possible to eliminate the harmonics to which each transformer or group of transformers is related.

Figure 2:
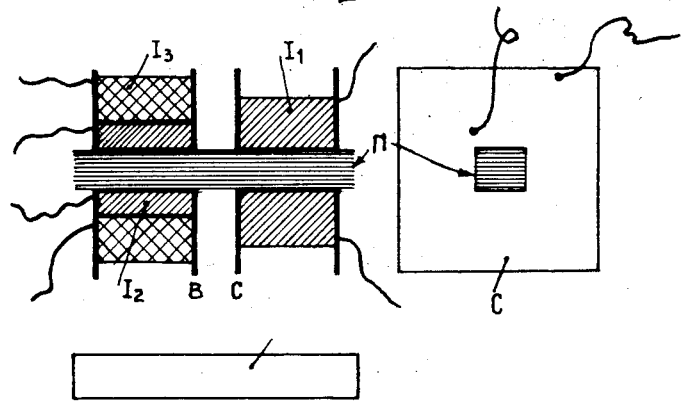
Figure 2 is an example of construction of a transformer with open circuit used in a harmonic-selecting arrangement.

Figure 2 shows an example of realisation of a transformer for a selecting arrangement according to the invention. The transformer shown is of the open magnetic circuit type. It comprises a core N formed by a bundle of laminated rectangular iron strips generally indicated by the reference A, upon which are mounted two frames B and C. The frame B carries the primary winding $I^2$, which is connected to the oscillator, and upon which is wound the auxiliary winding $I_3$, provided for the purpose of reducing interference and undesirable frequencies. The windings $I_2$ and $I_3$ are thus close coupled. The frame C carries the secondary winding $I_1$, which is connected on the one hand to earth, and on the other hand to the grid of the triode valve preceding the amplifier. This secondary winding $I_1$ is coupled less tightly than the winding $I_3$ to the primary winding $I_2$, which is found to be advantageous.

Figure 3:
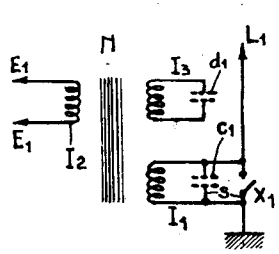
Figure 3 is a circuit diagram of the transformer according to Figure 2.

The electric circuit connections of such a transformer are given in Figure 3, in which are shown: the core N, the secondary winding $I_1$, connected on the one hand to the grid $L_1$ and on the other hand to earth (or more frequently inserted between other secondaries of other selector transformers connected in series between the grid and earth) and comprising a shunt circuit S in which is mounted a switch X, making it possible to put out of action, when it is closed, the transformer and the control elements $c^1$; the primary winding $I_2$ connected in the circuit of an oscillator $E_1$; and the auxiliary winding $I_3$, in the circuit of which are connected control elements $d_1$.

Figure 4:
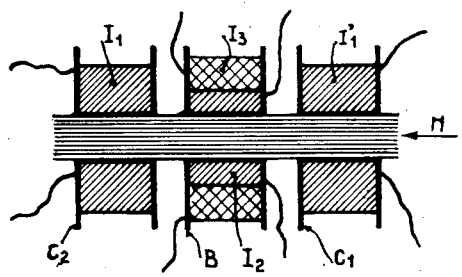
Figure 4 is another example of construction of an open-circuit transformer.

The transformer shown in Figure 4 is of the open-circuit type as in the preceding case, but it has two separate secondary windings which are connected in series to the grid of the valve. The core N is constituted by an assembly of laminated iron strips. The frame B, mounted on the core N, carries the primary and auxiliary windings $I_2$ and $I_3$. On either side of the frame B are mounted on the core N two frames $C_1$ and $C_2$, each carrying a secondary winding $I_1$ and $I'_1$ respectively, with similar or different characteristics as the case may be.

Figure 5:
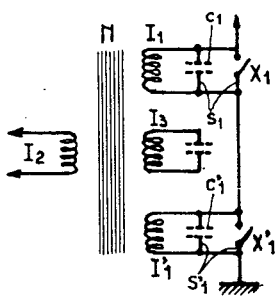
Figure 5 is a circuit diagram of a transformer constructed according to Figure 4.

Figure 5 shows the electric circuit connections of such a transformer. The circuits $s_1$ and $s'_1$ shunting the secondary windings $I_1$ and $I'_1$ each comprise a switch $X_1$ and $X'_1$, making it possible to put into or out of action the corresponding winding and control elements $c_1$ and $c'_1$, which may be different or similar. There has thus been in fact provided a system capable of replacing to a certain extent a group of two transformers, the windings of which connected to the grid are in series.

Figure 6:
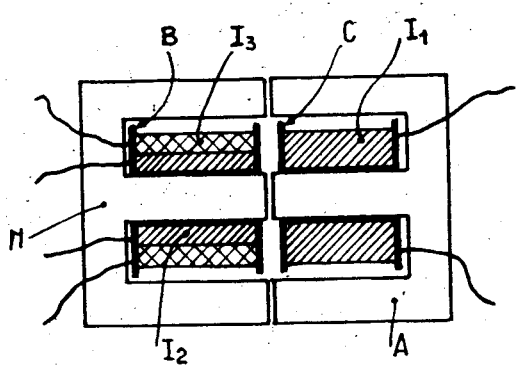
Figure 6 is an example of construction of a closed-circuit transformer.

Figure 6 shows a transformer of the closed circuit type, the magnetic circuit N of which has the form of two E's joined by their limbs. The frame B carrying the primary and auxiliary windings $I_2$ and $I_3$ wound one over the other, and the frame C carrying the secondary winding $I_1$, are mounted side by side on the central limb of the magnetic circuit. The electric circuit diagram of this transformer is similar to that given in Figure 3.

It is possible without going outside the ambit of the invention to modify the arrangement of the windings, to increase their number and to choose any possible form or constitution of the magnetic circuit.

When the harmonic-selector is part of a complex electrical musical instrument, such for example as an electric organ, it is convenient to group all the elements on a single chassis or supporting frame.

Figure 7:
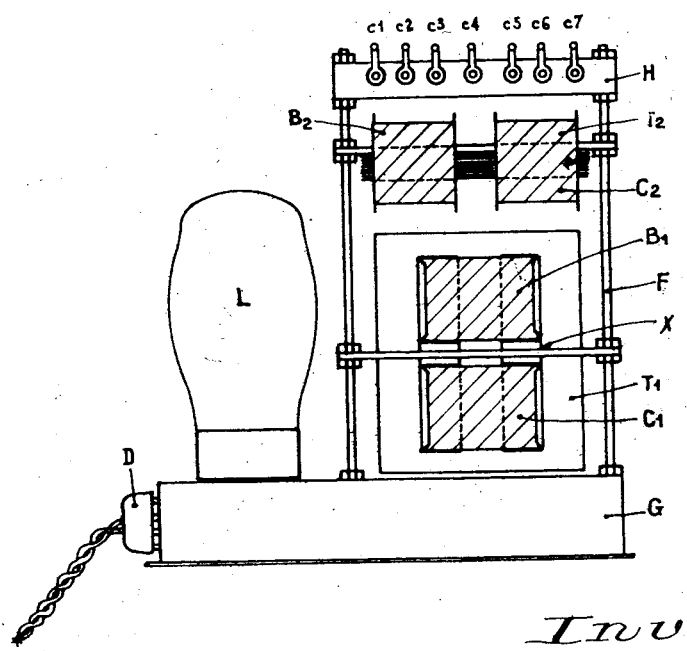
Figure 7 shows a method of assembling the various elements of a selecting arrangement on a single chassis or supporting frame.

Figure 7 shows an example of this. In this figure the selecting transformers $T_1$ and $T_2$ constituting the chain previously defined are fixed on a chassis F, which in its turn is mounted on a base plate G. The transformer $T_1$ is of the closed type and carries the coils $B_1$ and $C_1$; whereas the transformer $T_2$ is of the open type and carries the coils $B_2$ and $C_2$. The control elements of the windings are contained in the base G, upon which is mounted a multiple-electrode valve L.

On the upper part of the chassis, a strip H of insulating material carries a series of connecting terminals $c_1, c_2, c_3, c_4 \ldots$, to which are connected the windings of the coils $B_1, C_1, B_2, C_2$, the control elements, and the valve L. A plug D enables the selector system thus constituted to be branched between the oscillation-generator and the amplifier connected to the loud-speaker. A selector group like that described is provided for example for a range of $n$ successive notes. It is then repeated by a similar system for the following $n$ notes, and so on. A suitable number of such selector groups renders it possible in this way to cover the required number of octaves.

Figure 8:
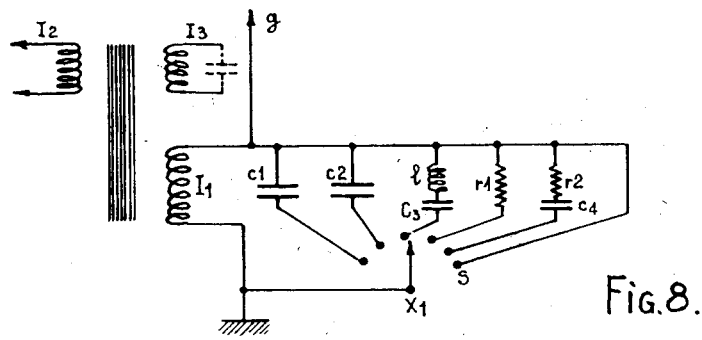
Figure 8 is a circuit diagram of a transformer for a selecting arrangement in which the circuit shunting the winding connected to the valve grid comprises several electric or magnetic elements which can be put into action separately or put out of action simultaneously.

Figure 8 shows diagrammatically an example of the circuit connections of the various control elements of the secondary circuit of a selector transformer. The secondary winding $I_1$ of the transformer, connected to the grid $g$ of the valve and to earth, is provided with a shunt circuit in which are mounted in parallel various control elements, namely: a condenser $c_1$, a condenser $c_2$ of different value from the preceding, an inductance $l$ connected in series with a condenser $c_3$, a resistance $r_1$, and a resistance $r_2$ connected in series with a condenser $c_4$. All these elements are connected to the contact studs of a revolving contact switch $X_1$, the last stud S being connected directly to the output of the winding $I'$. The movable brush of the switch $X_1$ is connected to the input of the winding $I'$. By controlling the switch $X_1$, one of the control elements $c_1, c_2, c_3, l$ etc. is put into or out of action, and the characteristics of the oscillation applied to the grid $g$ are thus modified. When the brush is placed on the stud S, the transformer is short-circuited and thus put out of action, and no oscillation is transmitted.

Figure 9:
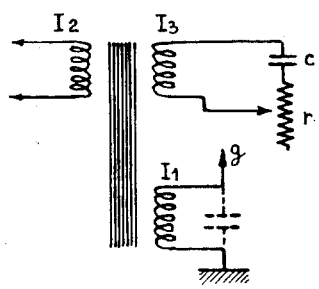
Figure 9 is another example of a transformer circuit in which the shunt circuit of the auxiliary winding provided for the elimination of undesirable frequencies or interference comprises adjustable electrical control elements.

A similar control may be applied to the transformer winding intended to eliminate interference or undesirable frequencies, to the terminals of which are branched the control elements, adjustable or not, as required. A diagrammatic example of circuit connection is shown in Figure 9. The shunt circuit of the auxiliary winding $I_3$ of the transformer comprises a condenser $c$ and a variable resistance $r$. The adjustment of the resistance $r$ makes it possible to modify the action of the winding $I_3$.

It should be noted that for all the selector transformers of the same rank, on the same system, it is often an advantage to control simultaneously, by the same mechanical means, all the resistances such as $r$ with which the transformers in question are provided.

The methods of control and regulation described above give rise to many combinations, which fall within the scope of the invention. The variety of tone qualities, the extent of the musical range controlled, and the power of emission may advantageously be as great as possible, and a good result is obtained by judiciously selecting the number and characteristics of the transformers and of the control elements. Simple and satisfactory harmonic-selecting systems can thus be obtained.

Figure 10:
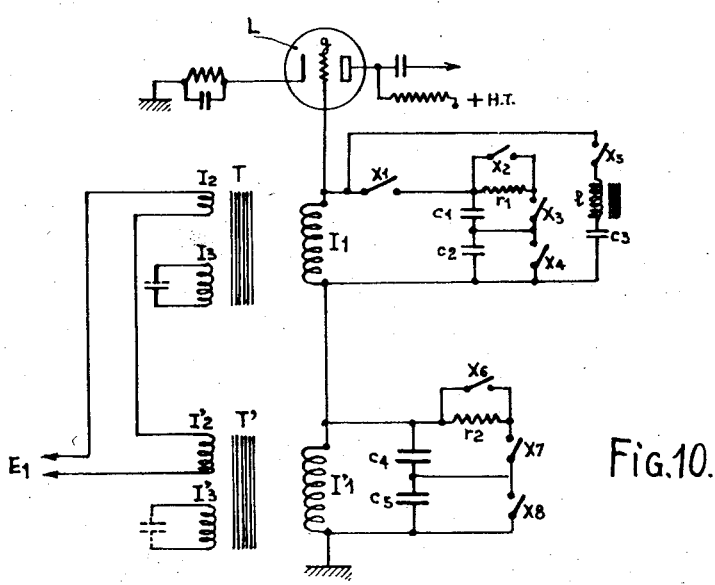
Figure 10 is a general example of assembly of a selecting arrangement according to the invention in which the putting into or out of action at will of one or more of the various control elements of the shunting circuit of the transformer windings connected to the grid makes it possible to obtain varied and different tone qualities.
Figure 12:
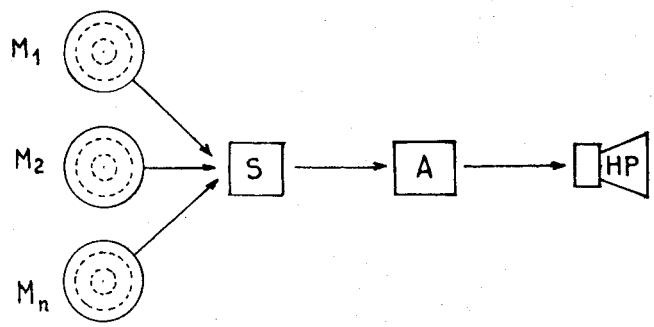
Figures 12, 13 and 14 show the utilisation of the harmonic-selecting arrangement according to the invention for effecting control of the low-frequency current produced by oscillators of various types.

An example of combined circuit connection is shown diagrammatically in Figure 10, in which the selecting transformers T and T' have their secondary windings $I_1$ and $I'_1$ connected in series, and connected on the one hand to the grid $g$ of the valve L and on the other hand to earth. The shunt circuit of the winding $I_1$ is constituted by the connection according to a particular arrangement of condensers $c1$, $c2$, $c3$, of a resistance $r1$, an inductance $l$ and switches X1, X2, X3, X4, X5. In similar fashion, the shunt circuit of the winding $I'_1$ comprises the condensers $c4$, $c5$, the resistance $r2$, and the switches X6, X7, X8.

It can be seen at once that if the switches are closed (except X5) the transformers are both short-circuited, and no oscillation is transmitted to the valve L, and the loud-speaker emits no sound.

If the switches X2 and X5 are kept open, the condenser $c1$ and the resistance $r1$ are put in circuit. A sweet or mellow tone is obtained, like that of the bourdon stop of an organ.

If X4 and X5 are opened, the condenser $c2$ is in circuit and the note becomes richer or stronger, like that of a flute stop.

If X3 and X5 are open the condenser $c1$ alone is in circuit, and it is chosen in such a way that the timbre is richer or stronger than in the preceding case.

The simultaneous opening of X3 and X4, with X5 still remaining open, gives another flute-like tone quality and similarly, the combined manipulation of the two switches X3 and X4 conveys to the ear the impression of several flute stops.

If again the switches X1 and X5 are open, the winding $I_1$, being shunted only by its own capacitance, transmits the higher harmonics, giving a sound like that of a trumpet stop.

Finally, the closing of the switch X5 considerably modifies the timbre obtained by the manipulations just described, so that in this case the tone of several different musical instruments can be obtained, such as the oboe, octave-flute (fife or piccolo) etc.

In similar fashion, the combined manipulations of the switches controlling the shunt circuit of the winding $I_1$ make it possible to increase the variety of tone qualities and the range of pitch of the selector.

Figure 11:
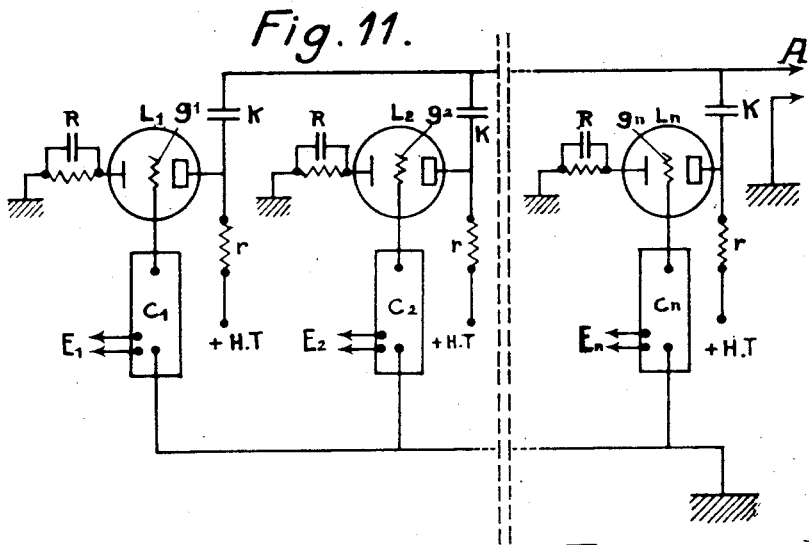
Figure 11 is a circuit diagram of apparatus comprising several harmonic-selecting arrangements constructed according to the invention.

When the low-frequency alternating current to be controlled is supplied by a number of independent oscillators, each of these may be connected to a harmonic-selector which is suited to it. Figure 11 shows an arrangement of this type in which several oscillators $E_1$, $E_2$, $E_n$ are used, each branched on a chain of harmonic-selector circuits $C_1$, $C_2$, $C_n$ respectively. These arrangements $C_1$, $C_2$, $C_n$ are each constituted by a chain of transformers as previously described, the secondary windings of which act on the grids $g^1$, $g^2$, $g^n$ respectively of triode valves. The cathode of each of the valves is connected to earth through the medium of a unit comprising a resistance and a polarisation condenser R, and the plate circuit of each valve is connected through the medium of a condenser K to the input of an amplifier A acting upon the sound-output apparatus, such as a loud-speaker. A high-tension source HT supplies the plate of each valve through a resistance $r$.

The modulated current arriving at the amplifier is thus represented by the group of alternating currents produced in the valves $L_1$, $L_2$, $L_n$, under the modulating action impressed on the grid by the current emanating from the oscillators after selection of the harmonics in the chains of transformers.

The number of transformers in each chain can be chosen at will, so it can easily be seen that it is possible to carry the selection of harmonics as far as may be required and indeed the latter may be eliminated to any desired extent, even completely, leaving only the fundamental wave.

By way of example, in the practical application of the invention to the construction of an electric organ, the set of contact-making switches controlling the shunt circuits of the transformers selecting the harmonics in all the chains may be connected in any desired combination to controlling members, such as organ stops, enabling the performer to operate these switches either individually or in various groups at will. In this way it is possible to put into or out of action, as previously described, one or other of the chains of transformers of the selecting apparatus, any particular transformer in each of the chains, or any control element for the shunt circuit of each transformer, regulating in this way at each moment the timbre, the quality and the power of the resultant sound emitted.

It is possible to conceive a musical instrument divided up into groups of a certain number of notes, each group acting on one of the microphones used, which is connected to a selector group contained in the harmonic-selecting apparatus and designed to synchronise with the notes selected.

Figure 13:
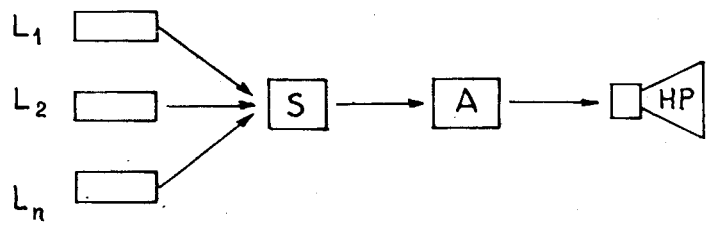

In Figure 13 the oscillations are transmitted to the selector S by a series of vibration-reading or scanning devices $L_1$, $L_2$, $L_n$ etc., which may be electro-magnetic, electrostatic, electro-dynamic, piezo-electric, or of any other type.

Figure 14:
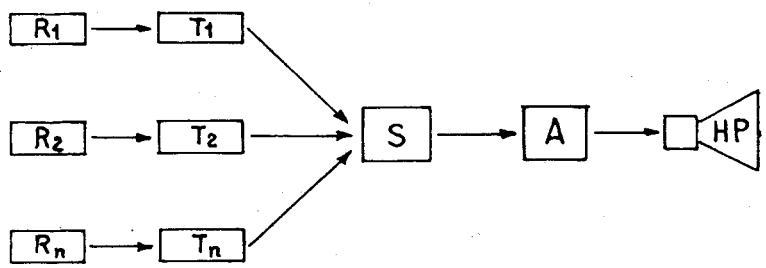

As shown in Figure 14, the oscillations received may also emanate from selective sound resonators $R_1$, $R_2$, $R_n$ etc. They are transformed into electrical oscillations by the systems $T_1$, $T_2$, $T_n$ and then transmitted to the suitably tuned groups of the harmonic-selector S.

An arrangement constructed in accordance with the latter conditions and placed beside a musical instrument modifies the sound produced, the timbre and intensity of which can be adjusted at will.

In order to serve as a guide to the circuit values of the various elements of the apparatus, the following values are given by way of example for the arrangement shown in Figure 10.

The valve is a 6J6, the cathode of which is earthed through a resistance of 2,000 ohms shunted by a condenser having a capacity of 10 microfarads. The plate circuit of this valve is connected to the high tension positive pole through a resistance of 250,000 ohms, and the coupling condenser may have a capacity between 0.005 and 0.5 microfarad.

The transformer T has a core of the shape shown in Figure 2, the inductance of the respective windings $I_2$, $I_3$, $I_1$ being 0.00015, 1.24 and 4.36 henries. The transformer T' has a core of the shape shown in Figure 6, the inductance of the respective windings $I'_2$, $I'_3$ and $I'_1$ being 0.0014, 11.9 and 29.7 henries.

The value of the inductance $l$ is 3 henries and the resistances $R^2$, $R^3$ have a value of 10,000 ohms. The capacity of the condenser connected to the terminals of the winding $I^3$ is 0.1 microfarad, the capacity of the condenser connected to the terminals of the winding $I'_3$ being also 0.1 microfarad.

The capacity of the condensers $C^1$, $C^2$, $C^4$, $C^5$ lie between 0.002 and 0.25 microfarad, according to the acoustic frequency at which the element is to operate. The capacity of the condenser $C^3$ lies between 0.005 and 0.03 microfarad More generally, the arrangement is capable of modifying the timbre and volume of any sound emission.

Numerous alternative arrangements can be carried out by applying the characteristics hereinbefore set forth without going outside the ambit of the invention.

I claim:

1. A harmonic selecting device, comprising in combination, a thermionic valve, a chain of audio-frequency transformers having the primary windings thereof connected in series for connection to a source of audio frequency alternating electric current, said transformers having their secondary windings connected in series to the control electrode of the thermionic valve, switch means for selectively short-circuiting said secondary windings to enable one or more transformers in the chain to be instantly put out of operation, and auxiliary attenuating circuits including windings coupled to the windings of the respective transformers for eliminating undesired frequencies.

2. A harmonic selecting device, comprising in combination, a thermionic valve, a chain of audio-frequency transformers having the primary windings thereof connected in series for connection to a source of audio frequency alternating current, each transformer having a secondary winding loosely coupled to the primary winding thereof, the secondary windings of the respective transformers connected in series to the control electrode of the thermionic valve, switch means for selectively short-circuiting said secondary windings to enable one or more transformers in the chain to be instantly put out of operation, and auxiliary attenuating circuits including windings in close coupled relationship to the primary windings of the respective transformers for eliminating undesired frequencies.

3. In an electronic musical instrument, a harmonic selecting device, comprising in combination, a thermionic valve, a chain of audio frequency transformers having the primary windings thereof connected in series for connection to a source of audio frequency alternating electric current, said transformers having their secondary windings connected in series to the control electrode of the thermionic valve, shunt circuits connected across the secondary windings of the respective transformers, each shunt circuit including at least one tuning element for modifying the transformer characteristic, auxiliary attenuating circuits including windings coupled to the windings of the respective transformers for eliminating undesired frequencies, and switch means for selectively short-circuiting said secondary windings to enable one or more transformers in the chain to be instantly put out of operation for regulating the harmonics transmitted to the control electrode of the thermionic valve.

4. In an electronic musical instrument, a harmonic selecting device, comprising in combination, a thermionic valve, a chain of audio frequency transformers having the primary windings thereof connected in series for connection to a source of audio frequency alternating electric current, said transformers having the secondary windings thereof connected in series to the control electrode of the thermionic valve, a plurality of tuning elements connected to each transformer secondary winding, switch means for shunting said tuning elements selectively across said secondary winding to modify the transformer characteristic and regulate the harmonics transmitted to the control electrode of the thermionic valve through the transformer, auxiliary attenuating circuits including windings coupled to the windings of the respective transformers for eliminating undesired frequencies, and switch means for selectively short-circuiting said secondary windings to enable one or more transformers in the chain to be put out of action for regulating the harmonics transmitted to the control electrode of the thermionic valve through the chain.

MARIE-THÉRÈSE MARTIN.

REFERENCES CITED

The following references are of record in the file of this patent:

UNITED STATES PATENTS

| Number | Name | Date |
|---|---|---|
| 1,295,691 | Cahill | Feb. 25, 1919 |
| 1,530,498 | Kendall | Mar. 24, 1925 |
| 1,597,420 | Austin | Aug. 24, 1926 |
| 2,069,316 | Lansing | Feb. 2, 1937 |
| 2,233,948 | Kock | Mar. 4, 1941 |
| 2,328,282 | Kock | Aug. 31, 1943 |
| 2,333,148 | Botsford | Nov. 2, 1943 |
| 2,403,090 | Larsen | July 2, 1946 |

FOREIGN PATENTS

| Number | Country | Date |
|---|---|---|
| 884,077 | France | Aug. 2, 1943 |